United States Patent
Wen et al.

(10) Patent No.: US 12,115,475 B2
(45) Date of Patent: Oct. 15, 2024

(54) ROTARY EVAPORATOR FOR ACCURATELY AND QUANTITATIVELY RECOVERING MULTIPLE SOLVENTS OR CONCENTRATING MULTIPLE SAMPLES AT ONE TIME

(71) Applicant: Beijing Normal University, Beijing (CN)

(72) Inventors: Shuyao Wen, Beijing (CN); Wenda Li, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 318 days.

(21) Appl. No.: 17/687,897

(22) Filed: Mar. 7, 2022

(65) Prior Publication Data

US 2022/0184521 A1  Jun. 16, 2022

Related U.S. Application Data

(63) Continuation of application No. PCT/CN2020/114217, filed on Sep. 9, 2020.

(30) Foreign Application Priority Data

Sep. 10, 2019 (CN) .......................... 201910850608.6
Sep. 10, 2019 (CN) .......................... 201910850616.0
(Continued)

(51) Int. Cl.
*B01D 3/08* (2006.01)
*B01D 1/00* (2006.01)
(Continued)

(52) U.S. Cl.
CPC ............ *B01D 3/085* (2013.01); *B01D 1/0017* (2013.01); *B01D 3/02* (2013.01); *B01D 5/0012* (2013.01);
(Continued)

(58) Field of Classification Search
CPC ........ B01D 3/085; B01D 1/0017; B01D 3/02; B01D 5/0012; B01D 5/0045; B01D 5/006; B01D 5/009
See application file for complete search history.

(56) References Cited

U.S. PATENT DOCUMENTS 2,865,445 A    12/1958  Buchler
5,879,516 A     3/1999  Kasman
(Continued)

FOREIGN PATENT DOCUMENTS

CN    205007600 U    2/2016
CN    108043058 A    5/2018
(Continued)

OTHER PUBLICATIONS

English machine translation of CN 208493280 (Year: 2019).*
English machine translation of CN 108043059 (Year: 2018).*
English machine translation of CN 205007600 (Year: 2016).*
(Continued)

*Primary Examiner* — Renee Robinson
(74) *Attorney, Agent, or Firm* — DUANE MORRIS LLP

(57) ABSTRACT

A rotary evaporator for accurately and quantitatively recovering multiple solvents or concentrating multiple samples at once is provided. At least two distillation flasks are included. The distillation flasks are connected in sequence and rotated along the same axis. A bracket is disposed at the lower part between the distillation flasks for support. Instead of one rotation axis, at least two axes are included. Each rotation axis is provided with at least one distillation flask. The number of condensers and the number of collecting flasks increase correspondingly with the number of distillation flasks. If the number of distillation flasks on one rotation axis is greater than 1, a connector is disposed between the condenser and a transmitter. The collecting flask can be changed into a collector with the function of accurately quantitating and discharging distillates. Each distillation (Continued)

flask may be connected to a concentrated liquid quantitative assembly.

15 Claims, 5 Drawing Sheets

(30) Foreign Application Priority Data

Sep. 25, 2019 (CN) .......................... 201910908061.0
Sep. 25, 2019 (CN) .......................... 201910911630.7

(51) Int. Cl.
    *B01D 3/02* (2006.01)
    *B01D 5/00* (2006.01)

(52) U.S. Cl.
    CPC ........... *B01D 5/0045* (2013.01); *B01D 5/006* (2013.01); *B01D 5/009* (2013.01)

(56) References Cited

U.S. PATENT DOCUMENTS

| | | | |
|---|---|---|---|
| 11,185,791 B2 | 11/2021 | Wen | |
| 2005/0256349 A1* | 11/2005 | Jong | ...................... C07C 17/386 |
| | | | 570/177 |

FOREIGN PATENT DOCUMENTS

| | | | | |
|---|---|---|---|---|
| CN | 108043059 A | | 5/2018 | |
| CN | 207545853 U | | 6/2018 | |
| CN | 208493280 U | | 2/2019 | |
| CN | 109529391 A | | 3/2019 | |
| EP | 1690578 | * | 8/2006 | ............... B01D 3/00 |
| EP | 1690578 A1 | * | 8/2006 | ........... B01D 1/0047 |

OTHER PUBLICATIONS

China National Intellectual Property Administration (ISA), International Search Report issued Dec. 16, 2020, for International Patent Application No. PCT/CN2020/114217 (English translation provided).

\* cited by examiner

ROTARY EVAPORATOR FOR ACCURATELY AND QUANTITATIVELY RECOVERING MULTIPLE SOLVENTS OR CONCENTRATING MULTIPLE SAMPLES AT ONE TIME

PRIORITY CLAIM AND CROSS-REFERENCE

This application claims the benefit of and priority to International Patent Application No. PCT/CN2020/114217, filed Sep. 9, 2020, which claims the priority of prior Chinese Patent Applications submitted to the China Patent Office on Sep. 10, 2019 with the application number of 201910850608.6 and 201910850616.0, and on Sep. 25, 2019 with the application number of 201910908061.0 and 201910911630.7. The entire content of prior Chinese Patent Applications and the International Application is incorporated herein by reference.

TECHNICAL FIELD

The present invention relates to the technical field of chemical experiment equipment, particularly to a rotary evaporator, and more particularly to a rotary evaporator for accurately and quantitatively recovering multiple solvents or concentrating multiple samples at once.

BACKGROUND

A rotary evaporator is extraction experiment equipment for performing reduced pressure distillation concentration on materials, is widely applied to experiments of scale concentration, drying, extraction recovery and the like of samples, and is especially used to fast distill a large number of solvents. An existing rotary evaporator generally consists of assemblies such as a vacuum pumping device, a heating device, a condensing device, a rotating device, etc. The rotary evaporator has a main principle that through the control by electronic equipment, a flask rotates at the most suitable constant rotational speed to enable a solvent to form a film, thus increasing the evaporation area. An evaporation flask is in a negative pressure state through a vacuum pump. The evaporation flask is placed in a water bath pot or an oil bath pot to be heated at a constant temperature while rotating (the heating temperature may be close to the boiling point of the solvent), so that the solution in the flask is heated and diffused at negative pressure to be evaporated, and fast evaporation of the solvent is realized.

An existing rotary evaporator can only distill one sample at once, and the working efficiency is low. An existing parallel evaporator can distill many samples at once through shaking samples and vacuuming. The distillation efficiency of a single sample of the existing parallel evaporator is far less than that of an existing rotary evaporator resulting from a small evaporation area because each sample is put into a vertical tube. A rotary evaporator for accurately and quantitatively distilling multiple samples or recovering multiple solvents at once is needed urgently.

SUMMARY

The present invention provides:
(1) a rotary evaporator for accurately and quantitatively concentrating multiple samples at once (single rotation axis);
(2) a rotary evaporator for accurately and quantitatively recovering multiple solvents at once (single rotation axis);
(3) a multi-rotation axis rotary evaporator for accurately and quantitatively concentrating multiple samples at once; and
(4) a multi-rotation axis rotary evaporator for accurately and quantitatively recovering multiple solvents at once.

The present invention solves the low efficiency problem that a rotary evaporator can distill only one sample at once and the evaporation area of a parallel evaporator is small, and can quantitatively control recovered solvents or concentrated liquids.

In order to achieve the above objectives, first, the present invention first provides a rotary evaporator for accurately and quantitatively concentrating multiple samples at once, including a support frame, wherein a motor is fixed on the support frame. The motor drives a distillation flask group to rotate through a transmitter. A detachable distillation flask group is fixed at one end of the transmitter. A detachable condenser is fixed at the other end. A collecting flask is connected to a bottom of the condenser.

The distillation flask group includes at least two distillation flasks, and each distillation flask is connected to a concentrated liquid quantitative assembly.

The distillation flasks are connected in sequence as described herein and rotated along the same rotation axis.

In order to achieve the above objectives, the present invention second provides a rotary evaporator for accurately and quantitatively recovering multiple solvents at once, including a support frame, wherein a motor is fixed on the support frame; and the motor drives a distillation flask group to rotate through a transmitter. The detachable distillation flask group is fixed at one end of the transmitter, a detachable condenser group is connected to the other end, and a collector is connected to a bottom of each condenser in the condenser group. The distillation flask group includes at least two distillation flasks, and the distillation flasks are connected in sequence and rotated along the same rotation axis. The distillation flasks, the condensers, and the collectors have the same number. A connector is disposed between the condenser group and the transmitter. The solvent evaporation, condensation, and collection of each liquid to be distilled have respective independent pipelines that are not communicated with each other.

In order to achieve the above objectives, the present invention third provides a multi-rotation axis rotary evaporator for accurately and quantitatively concentrating multiple samples at once, including a support frame, wherein a motor is fixed on the support frame; and the motor drives distillation flasks on at least two axes to rotate through a transmitter. The distillation flasks form a distillation flask group. The detachable distillation flask group is fixed at one end of the transmitter, a detachable condenser or condenser group is fixed at the other end, and a collecting flask is connected to a bottom of each condenser. One distillation flask or at least two distillation flasks connected in sequence and rotated along the same axis is/are disposed on each rotation axis, and the distillation flask is connected to a concentrated liquid quantitative assembly. If the number of distillation flasks on one rotation axis is greater than 1, a connector is disposed between the condenser and the transmitter.

In order to achieve the above objectives, the present invention fourth provides a multi-rotation axis rotary evaporator for accurately and quantitatively recovering multiple solvents at once, including a support frame, wherein a motor is fixed on the support frame; and the motor drives distillation flasks on at least two axes to rotate through a transmitter. The distillation flasks form a distillation flask group.

The detachable distillation flask group is fixed at one end of the transmitter, a detachable condenser group is fixed at the other end, and a collector is connected to a bottom of each condenser.

Each rotation axis is provided with one distillation flask or at least two distillation flasks connected in sequence and rotated along the same rotation axis.

In a case that the number of distillation flasks on one rotation axis is greater than 1, a connector is disposed between the condenser and the transmitter.

The distillation flasks, the condensers, and the collectors have the same number, and the solvent evaporation, condensation, and collection of each liquid to be distilled have respective independent pipelines that are not communicated with each other.

For each of above four rotary evaporators provided by the present invention, a control panel and its components (not shown in the figure) are disposed to control the rotational speed and heating temperature.

For a multi-rotation axis rotary evaporator, there are preferably two or three rotation axes.

There is a dip angle between the rotation axis and the horizontal plane, and the dip angle is a certain degree from 2 degrees to 44 degrees, preferably a certain degree from 10 degrees to 35 degrees.

The number of the distillation flasks on each rotation axis is preferably a certain number from 1 to 3.

The distillation flasks can rotate in one direction or alternately in two directions. According to the axis on which a distillation flask is disposed and distances from the near to the distant between the distillation flask and the transmitter, a first distillation flask on the first axis, a second distillation flask on the first axis, a first distillation flask on the second axis, and a second distillation flask on the second axis are named.

Two flask openings are disposed on the distillation flask farthest from the transmitter on each rotation axis, and are respectively the first flask opening and the third flask opening. Three flask openings are disposed on the other distillation flasks, respectively the first flask opening, the second flask opening, and the third flask opening.

The first flask opening of a distillation flask is nearest to the transmitter. The center line of the first flask opening and the second flask opening of the distillation flask is on the same rotation axis. The third flask opening of the distillation flask is formed at the lowest liquid level position of the distillation flask in a working state, and is provided with a valve or is connected to the concentrated liquid quantitative assembly.

The structure of the concentrated liquid quantitative assembly is similar to the airlock chamber of a spacecraft. The concentrated liquid quantitative assembly includes a first liquid discharge valve disposed on the third flask opening of the distillation flask, a quantitative tube with quantitative scale lines and a second liquid discharge valve disposed at an end of the quantitative tube away from the distillation flask. Under the different pressure of vacuum environment inside the evaporation system and external environment, cooperation of the two valves is used to quantitate the concentrated liquid, accurately and quantitatively discharge the concentrated liquid, and seal the distillation flask.

The valve is used to discharge the concentrated liquid or vent the atmosphere and feed liquid if the orientation of the third flask opening is adjusted.

The concentrated liquid quantitative assembly and the third flask opening are integrally formed or connected by glass ground openings and fixed by a clamp.

The material of the first liquid discharge valve and the second liquid discharge valve is polytetrafluoroethylene or glass.

According to a capacity requirement of the concentrated liquid, a capacity increase unit may be disposed at the lower part of the quantitative tube and is used to realize capacity increase liquid discharge at once.

The second flask opening of the first distillation flask and a first flask neck (or a first flask opening) of the second distillation flask on the same rotation axis are connected in a sealed way by glass ground openings and are fixed by a clamp, or the first distillation flask is connected to the second distillation flask by a coupling.

A bracket is disposed at the lower part between two adjacent distillation flasks on the same rotation axis for support.

The cross-section center line of the first flask neck of the distillation flask farthest from the transmitter on each rotation axis coincides with the rotation axis.

A spherical structure is preferably configured near the flask body at the flask neck where the first flask opening of the distillation flask is located and is used to prevent bumping.

In a case that the number of distillation flasks on one rotation axis is greater than 1, a connector is disposed between the condenser and the transmitter.

The connector includes a base plate and condensing tubes and steam tubes respectively located on both sides of the base plate. The base plate is a round plate with holes. Each base plate corresponds to one rotation axis and is fixed at an end close to the condenser of the transmitter by a lock nut and a sealing ring.

The material of the connector is polytetrafluoroethylene or a material that does not react with solvents.

For the case that the solvent evaporation, condensation, and collection of each liquid to be distilled have respective independent pipelines that are not communicated with each other, at least two condensing tubes are disposed on a side near the condenser of the base plate. The condensing tubes are round, the centers of the tubes are not mutually coincident. A first condensing tube is in communication with a first condenser, and a second condensing tube is in communication with a second condenser. At least two steam tubes are disposed on a side near the transmitter of the base plate. All steam tubes are round and have coinciding centers. The diameters of a first steam tube and a second steam tube decrease in turn. The first steam tube is in communication with the first distillation flask, and the second steam tube is in communication with the second distillation flask. The evaporated gas from the first distillation flask first passes through the first steam tube, then passes through the first condensing tube, and at last enters the first condenser for condensation. The evaporated gas from the second distillation flask first passes through the second steam tube, then passes through the second condensing tube, and at last enters the second condenser for condensation.

For the case of only one condenser, the evaporated gases in several distillation flasks first pass through respective steam tubes, then pass through respective condensing tubes, then pass through a main condensing tube, and at last enter the condenser for condensation.

The first steam tube and a glass shaft are fitted and are connected in a sealed way. The glass shaft is a hollow glass tube on the innermost layer of the transmitter on each rotation axis and does not rotate with the motor. The second steam tube and a first flask opening of the second distillation flask (or its extension tube) are fitted and are connected in a sealed way.

The condensers in the condenser group are preferably placed vertically, arranged in parallel, and fixed by a frame.

A vacuum tube is disposed on the condenser, and the condenser is connected to the vacuum pump by the vacuum tube.

A vacuum branch tube is respectively disposed on each condenser in the condenser group, and each vacuum branch tube is connected to the vacuum tube and is connected to the vacuum pump by the vacuum tube.

A switch (not shown in the figure) may be disposed on each branch vacuum tube or vacuum tube as required for ventilation.

A check valve may be disposed on each vacuum branch tube as required to avoid mutual pollution.

A lower end opening of the condenser is connected to the collecting flask or collector by glass ground openings, and the connection is fastened with a clamp.

The collector includes a first liquid discharge valve at the lower end opening of the condenser, a second liquid discharge valve at the lower part of the collector, and a quantitative tube with quantitative scale lines and a collecting flask with an accurate capacity that are disposed between the two valves. The structure is similar to an air lock chamber. The collector is used for quantitative discharge of a condensate under different pressures of the vacuum environment inside the evaporation system and external environment, as well as system sealing.

The distillation flask is heated by a heating assembly. The heating assembly is an electric heating belt disposed on the outer wall of the distillation flask. An outer layer of the electric heating belt is provided with a glass fiber belt to realize the heat insulation and fixation of the electric heating belt. A temperature controller sensor probe is also arranged between the electric heating belt and the distillation flask.

The material of the first liquid discharge valve and the second liquid discharge valve is glass or polytetrafluoroethylene.

In order to avoid the unsteadiness in the rotation of the distillation flask, the two sides of any plane where the rotation axis of the distillation flask is located have the same mass.

The advantages of the present invention include:

(1) The original one rotation axis is changed into at least one rotation axis. The original one distillation flask is changed into at least two distillation flasks. The flask openings are added. Two adjacent distillation flasks on the same rotation axis are connected in sequence as described herein and supported by a bracket. Rotary evaporation of multiple samples to be distilled at once is realized. The working efficiency of the rotary evaporator of the present invention is at least two times that of an existing rotary evaporator.

(2) A connector is disposed between the original transmitter and the condenser, and the condensers and the collectors are disposed according to the number required, so that the evaporated gas from each distillation flask may be condensed in one condenser and collected in one collector, or may be transported to respective condensers for condensation and collected in respective collectors. The pipelines are not communicated with each other, so as to realize concentration of multiple samples or recovery of multiple solvents by rotary evaporation at once.

(3) The third flask opening is disposed at the lowest liquid level position of the distillation flask in a working state and connected to the concentrated liquid quantitative assembly, which is used to accurately and quantitatively discharge the concentrated liquid under different air pressure of vacuum environment inside the evaporation system and the external environment and seal the distillation system. The third flask opening can also be used for ventilation and feeding if the orientation is adjusted.

(4) The structure of collector is similar to a "airlock chamber", a first liquid discharge valve is disposed at the upper part, a second liquid discharge valve is disposed at the lower part, and a quantitative tube with scale lines and a collecting flask with an accurate capacity are disposed between the two valves. With the cooperation of the two valves, a quantitative distillate can be discharged without great impact on the system, with an accuracy of 0.01 ml.

(5) The advantages of using an electric heating belt to heat the distillation flasks are as follows: 1) the space resistance is eliminated, making it easy to dispose multiple rotation axes and multiple distillation flasks, and making it easy to install the concentrated liquid quantitative assembly. 2) the water and oil consumption for heating are reduced. 3) a lifting system does not need to be used because the concentrated liquid can be discharged directly from distillation flask, the components are reduced, and the cost is reduced.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

Figure 1:
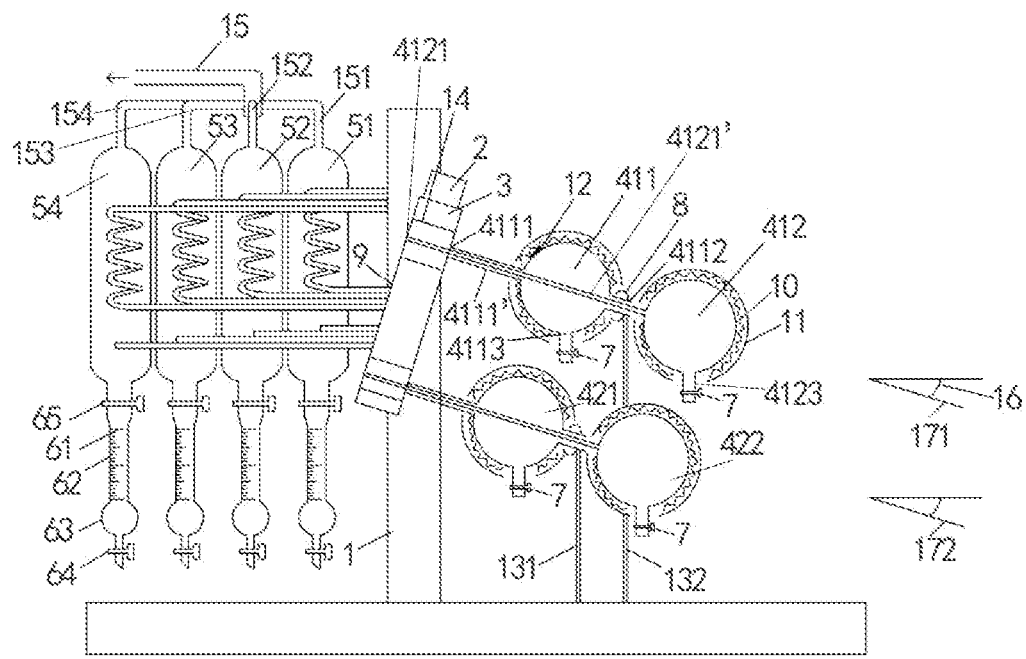
FIG. 1 is a schematic structure diagram of a multi-rotation axis rotary evaporator for accurately and quantitatively recovering multiple solvents at once according to an embodiment of the present invention.

The reference numerals marked include:

1—support frame, 2—motor, 3—transmitter, 4—distillation flask group (including 411, 412, 421, 422 or 41, 42, 43), 5—condenser group (including 51, 52, 53, 54) (a condenser is denoted in FIG. 4 and FIG. 5), 6—collector (including 61, 62, 63, 64, 65) (a collecting flask is denoted in FIG. 2, FIG. 4, and FIG. 5), 7—valve (a concentrated liquid quantitative assembly is denoted in FIG. 2, FIG. 4, FIG. 5, including 71, 72, 73, 74), 8—clamp, 9—connector, 10—electric heating belt, 11—glass fiber belt, 12—temperature sensor, 13—bracket (including 131, 132), 14—glass shaft, 15—vacuum tube, 16—dip angle, 17—rotation axis (including 171 and 172), 18—capacity increase unit, and 19—solution receiving tray;

411—first distillation flask on the first axis and 412—second distillation flask on the first axis;

421—first distillation flask on the second axis and 422—second distillation flask on the second axis;

41—first distillation flask, 42—second distillation flask, and 43—third distillation flask;

4111—first flask opening of the first distillation flask on the first axis, 4112—second flask opening of the first distillation flask on the first axis, and 4113—third flask opening of the first distillation flask on the first axis;

4121—first flask opening of the second distillation flask on the first axis and 4123—third flask opening of the second distillation flask on the first axis;

4111'—first neck of the first distillation flask on the first axis and 4121'—first neck of the second distillation flask on the first axis; 4121a'—a part of first neck of the second distillation flask, 4121b'—extension tube;

51—first condenser, 52—second condenser, 53—third condenser, and 54—fourth condenser;

61—quantitative scale line, 62—quantitative tube, 63—collecting flask, 64—second liquid discharge valve, and 65—first liquid discharge valve;

71—first discharge valve, 72—quantitative scale line, 73—quantitative tube, and 74—second discharge valve;

91—base plate, 92—lock nut, 93—condensing tube, and 94—steam tube;

931—first condensing tube and 932—second condensing tube;

941—first steam tube and 942—second steam tube;

151—first vacuum branch tube, 152—second vacuum branch tube, 153—third vacuum branch tube, and 154—fourth vacuum branch tube; and 171—first rotation axis and 172—second rotation axis.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In order to make the above objectives, features and advantages of the present invention more obvious and comprehensible, the present invention is further described in detail below with reference to the drawings and specific implementations.

The rotary evaporator of the present invention is improved based on the RE-3000A rotary evaporator produced by Shanghai Yarong Biochemical Instrument Factory.

Embodiment 1

As shown in FIG. 1, a multi-rotation axis rotary evaporator for accurately and quantitatively recovering multiple solvents at once includes a support frame 1. A motor 2 is fixed on the support frame 1 (a control panel and its components for controlling the rotational speed of the motor and heating temperature are also disposed in the rotary evaporator of the present invention, and are not shown in the figure). The motor 2 drives distillation flasks on two rotation axes (171 and 172) to rotate through a transmitter 3. A detachable distillation flask group 4 is fixed at one end of the transmitter 3. A detachable condenser group 5 is fixed at the other end. A bottom of each condenser in the condenser group 5 is connected to a respective collector 6.

The distillation flasks can rotate in one direction or alternately in two directions. The two rotation axes are parallel to each other and have a dip angle with the horizontal plane, and the dip angle is 15 degrees. Each rotation axis is provided with two distillation flasks connected in sequence and rotated along the same rotation axis. Four distillation flasks form the distillation flask group 4; and correspondingly, four condensers form the condenser group 5; and four collectors 6 form a collector group. The term "connected in sequence" as described herein refers to the configuration of two or more distillation flasks connected along one same rotation axis, and in such a configuration, the two or more distillation flasks are connected next to each other exteriorly appearing "in series" but internally connected "in parallel" through separate openings and pipelines. The term "not communicated with each other" described herein refers to a configuration in which independent pipelines are separate from each other, have different fluid paths, and are not fluidly communicated with each other.

According to the axis on which a distillation flask is disposed and distances from the near to the distant between the distillation flask and the transmitter 3, a first distillation flask 411 on the first axis, a second distillation flask 412 on the first axis, a first distillation flask 421 on the second axis and a second distillation flask 422 on the second axis are named, and contain a liquid to be distilled 1*, a liquid to be distilled 2*, a liquid to be distilled 3* and a liquid to be distilled 4* respectively. The four liquids to be distilled may come from a same sample or from different samples.

Two flask openings are disposed on the distillation flask 412 farthest from the transmitter 3 on the first rotation axis 171, and are a first flask opening 4121 and a third flask opening 4123, respectively. Three flask openings are disposed on the distillation flask 411, and are a first flask opening 4111, a second flask opening 4112, and a third flask opening 4113 respectively. The flask openings are also disposed on the second rotation axis 172 the same as those on the first rotation axis 171.

The first flask opening 4111 of the first distillation flask on the first axis 171 is closest to the transmitter 3. The center line of the second flask opening 4112 and the first flask opening 4111 is on the same rotation axis. The third flask opening 4113 is formed at the lowest liquid level position of the distillation flask 411 in a working state and is provided with a valve 7. The center line of the cross section of the first flask neck 4121' of the second distillation flask coincides with the rotation axis 171. The third flask opening 4123 is formed at the lowest liquid level position of the distillation flask 412 in a working state and is provided with a valve 7.

The second flask opening 4112 of the first distillation flask on the first axis 171 is connected to the first neck 4121' of the second distillation flask on the first axis 171 in a sealed way by glass ground openings. The connection is fixed by a clamp 8 and is supported by a bracket 132, so as to ensure that the distillation flask 411 and the distillation flask 412 rotate along the same axis. Two distillation flasks on the second axis 172 are also connected and fixed in this way, and supported by a bracket 131.

Figure 10:
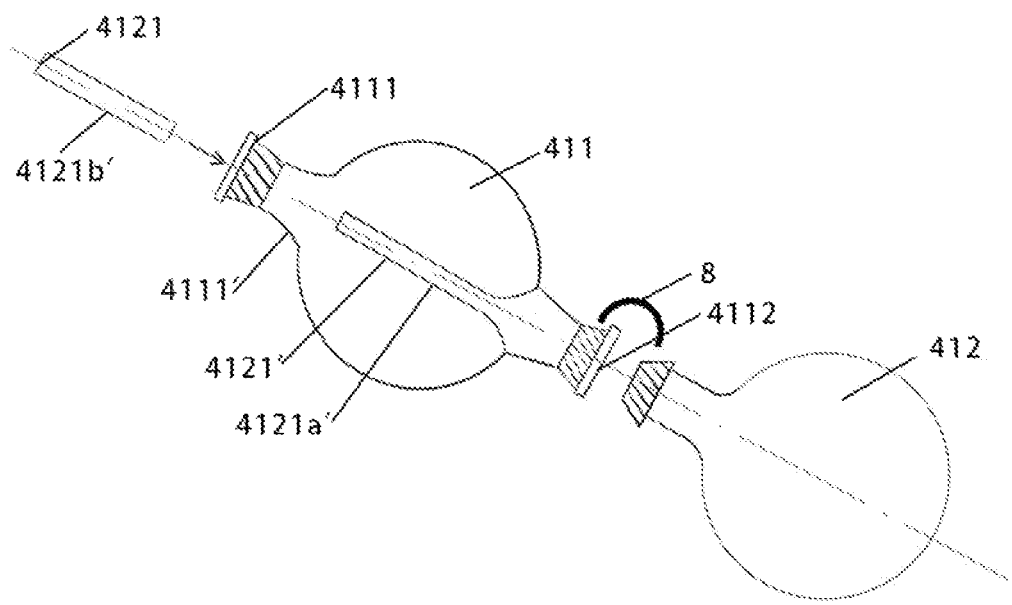
FIG. 10 is another schematic structure diagram of the distillation flasks of the rotary evaporator of the invention.

In some embodiments, the two distillation flasks on a same rotation axis can also be connected with the exemplary structure as shown in FIG. 10 (the third flask openings of the two distillation flasks are not shown). This structure is more readily fabricated with glass processing. The first neck 4121' of the second distillation flask 412 is integrated with the first distillation flask 411, not with the second distillation flask 412. A part 4121a' of the first neck 4121' of the second distillation flask is in the first distillation flask 411, and the length requirement of the first neck 4121' of the second distillation flask is met by sleeved extension tube 4121b'. The second distillation flask 412 is divided into two parts. The second distillation flask 412 is not integrated. As shown in FIG. 10, the second distillation flask 412 has two first flask openings. One first flask opening 4121 is at the end close to the connector of the extension tube, and the other is integrated with the second distillation flask 412 (the only flask opening of the second distillation flask 412).

Figure 3:
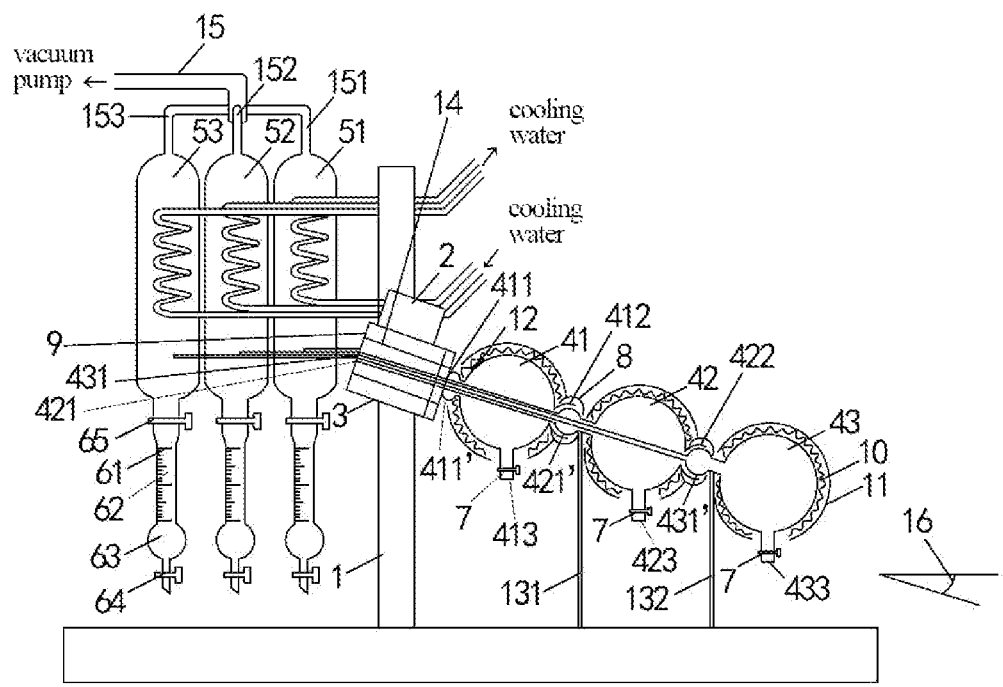
FIG. 3 is a schematic structure diagram of a rotary evaporator (single rotation axis) for accurately and quantitatively recovering multiple solvents at once according to an embodiment of the present invention.

A spherical structure (as shown in FIG. 3) is configured at the first flask neck near the flask body of the distillation flask to prevent bumping of the liquid to be distilled.

Figure 6:
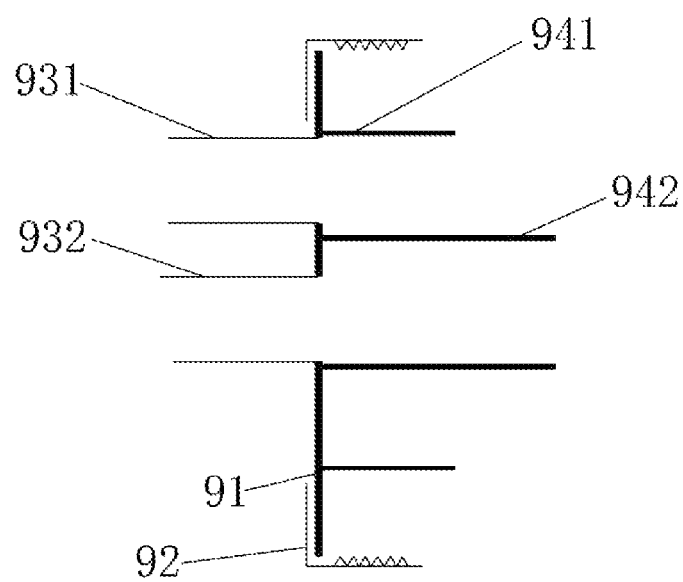
FIG. 6 is a schematic structural cross-sectional view of a connector of a rotary evaporator according to an embodiment of the present invention.
Figure 7:
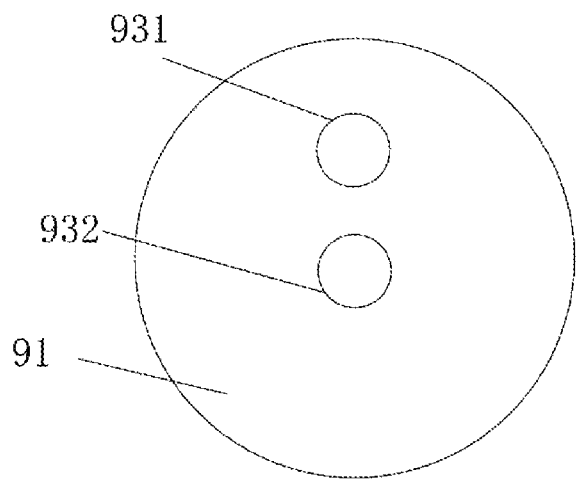
FIG. 7 is a left view of the connector of a rotary evaporator according to an embodiment of the present invention.
Figure 8:
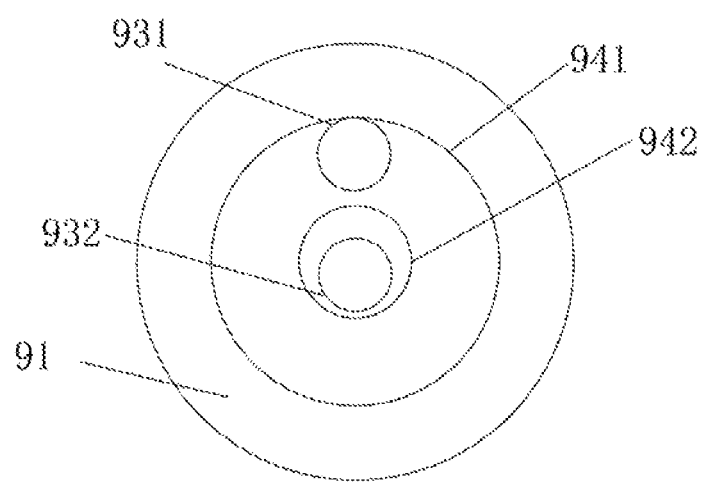
FIG. 8 is a right view of the connector of a rotary evaporator according to an embodiment of the present invention.

Two connectors 9 (as shown in FIG. 6, FIG. 7, and FIG. 8) are disposed between the condenser group 5 and the transmitter 3. Each connector 9 corresponds to one rotation axis. The connector 9 comprises a base plate 91, condensing tubes 93 and steam tubes 94 located respectively on both sides of the base plate 91. The base plate 91 is a circular plate with holes. Each base plate 91 is fixed at an end close to the condenser group 5 of the transmitter 3 by a lock nut 92 and a sealing ring (not shown in the figure). Two condensing tubes 93 are disposed on one side of the base plate 91 near the condenser. The diameters of the two condensing tubes 93 are the same, but the centers of the two condensing tubes are not coincident. A first condensing tube 931 is in communication with a first condenser 51. A second condensing tube 932 is in communication with a second condenser 52. Two steam tubes 94 are disposed on the other side of the base plate 91 near the transmitter 3. The centers of a first steam tube 941 and a second steam tube 942 coincide and the diameters decrease in turn. The first steam tube 941 on the first axis 171 is in communication with the first distillation flask 411. The second steam tube 942 is in communication with the second distillation flask 412. Evaporated gas from the first distillation flask 411 first passes through the first steam tube 941, then passes through a first condensing tube 931, and at last enters the first condenser 51 for condensation. The evaporated gas from the second distillation flask 412 first passes through the second steam tube 942, then passes through the second condensing tube 932, and at last enters the second condenser 52 for condensation. Evaporated gas from the first distillation flask 421 on the second axis 172 first passes through the first steam tube 941, then passes through the first condensing tube 931, and at last enters a third condenser 53 for condensation. Evaporated gas from the second distillation flask 422 first passes through the second steam tube 942, then passes through the second condensing tube 932, and at last enters a fourth condenser 54 for condensation.

The material of the connector 9 is polytetrafluoroethylene.

On the first rotation axis 171, the first steam tube 941 and a glass shaft 14 are fitted and are connected in a sealed way (the glass shaft 14 is a hollow glass tube on the innermost layer of the transmitter 3 on each rotation axis and does not rotate with the motor 2). The second steam tube 942 and a first flask opening 4121 of the second distillation flask (or its extension tube) are fitted and are connected in a sealed way. It is the same with the second rotation axis 172.

The solvent evaporation, condensation, and collection of the four solutions to be distilled have respective independent pipelines that are not connected to each other.

The four condensers are placed vertically, grouped in parallel and fixed by frames. A first vacuum branch tube 151, a second vacuum branch tube 152, a third vacuum branch tube 153 and a fourth vacuum branch tube 154 are respectively disposed at the four condensers. The vacuum branch tubes are connected to a vacuum tube 15 and connected to the vacuum pump (not shown in the figure) by the vacuum tube 15. A lower end opening of each condenser and a respective collector 6 are connected in a sealed way by glass ball ground openings fixed by a steel clamp 8.

A check valve is disposed on each vacuum branch tube as required to avoid mutual pollution.

The collector 6 comprises a first liquid discharge valve 65 disposed at the lower end opening of the condenser, a second liquid discharge valve 64 disposed at the lower part of the collector and a quantitative tube 62 and a collecting flask 63 those are disposed between the two valves. An "airlock chamber" comprises the two valves and the containers between the two valves and is used to control condensate discharge under two pressure of the vacuum environment inside the distillation system and the external environment and sealing of the distillation system.

The quantitative tube 62 is a measurable thin tube with quantitative scale lines 61 disposed on the outer wall and is used to read the volume value of a condensate. The measurable capacity of the quantitative tube is 5 ml, and the measurement accuracy may reach 0.05 ml.

The collecting flask 63 is spherical with the capacity accurately calibrated.

The material of the first liquid discharge valve 65 and the second liquid discharge valve 64 is polytetrafluoroethylene.

The distillation flask is heated by an electric heating belt 10 wrapped around the outer wall of the distillation flask. An outer layer of the electric heating belt 10 is provided with a glass fiber belt 11 for heat insulation and fixation of the electric heating belt 10. A temperature controller sensor probe 12 is disposed between the electric heating belt 10 and the distillation flask for temperature measurement.

Each second liquid discharge valve 64 is closed and each first liquid discharge valve 65 is opened first when the rotary evaporator of this embodiment is used, then the respective solution to be distilled is added to each distillation flask and each distillation flask is installed. A heating switch and a vacuum pump switch are turned on. The rotational speed is adjusted to the set value. Four distillation flasks rotate at the same time. Four solutions to be distilled are heated at the same time. Each evaporated gas enters the respective condenser and condenses into liquid during the suction of the vacuum pump. Each condensate is collected in the respective collector. The volume of a condensate is observed during distillation. The rotational speed is reduced when the volume of the condensate is close to the designed accurate amount. The first liquid discharge valve 65 is closed immediately as soon as the designed accurate volume is reached, then the rotational speed is adjusted to 0, and the heating switch and the vacuum pump switch are turned off. Each condensate of a determined volume is discharged when each second liquid discharge valve 64 is opened.

The advantages of this embodiment are as follows:

(1) The original one rotation axis is changed into two rotation axes. Two distillation flasks connected in sequence are disposed on each rotation axis. Four different solutions to be distilled can be evaporated at once. The working efficiency of the rotary evaporator in Embodiment 1 is nearly four times that of the prior art rotary evaporator. The original distillation flask with only one flask opening is changed into a distillation flask with three flask openings (the second distillation flask farthest from the transmitter is provided with two flask openings).

(2) A connector 9 is disposed between the transmitter and the condenser, the original one condenser is changed into four condensers, and the original one collecting flask is changed into four collecting flasks, so that the evaporated gases from the four distillation flasks are respectively transported to the respective condensers for condensation and collected in the respective collectors, so as to realize the recovery of four solvents by evaporation at once.

(3) The first liquid discharge valve 65 is disposed at the upper part of the collector, and the second liquid discharge valve 64 is disposed at the lower part. A quantitative tube 62 and a collecting flask 63 are disposed between the two valves. With the cooperation of the two valves, the accurate quantitative condensate can be discharged without great impact on the distillation system, and the accuracy can reach 0.05 ml.

(4) The advantages of using the electric heating belt 10 to heat the distillation flasks are as follows: 1) the space resistance is eliminated, making it easy to dispose the second rotation axis, install four distillation flasks, and four valves 7. 2) the water and oil consumption for heating are reduced. 3) a lifting system does not need to be used because the concentrated liquid can be discharged directly from distillation flask, the components are reduced, and the cost is reduced.

As a changeable structure, the number of distillation flasks, the number of condensers, and the number of collectors in the present invention may all be 2 (that is, one distillation flask is disposed on each rotation axis) or 3.

Embodiment 2

The difference between the rotary evaporator (as shown in FIG. 3) for accurately and quantitatively recovering multiple solvents at once in this embodiment and that in Embodiment 1 is that there is only one rotation axis, and three distillation flasks are disposed in sequence and rotated along the same axis. The working efficiency of the rotary evaporator in Embodiment 2 is nearly three times that of the prior art rotary evaporator. For the rest, see Embodiment 1.

Embodiment 3

Figure 2:
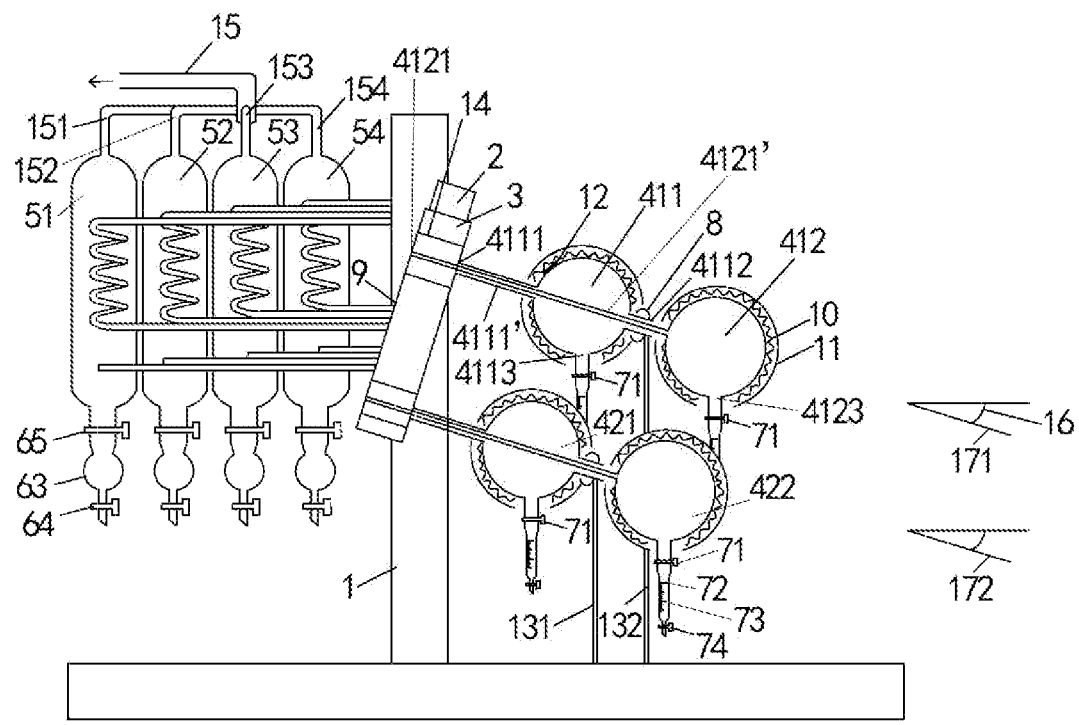
FIG. 2 is a schematic structure diagram of a multi-rotation axis rotary evaporator for accurately and quantitatively concentrating multiple samples at once according to an embodiment of the present invention.

As shown in FIG. 2, a multi-rotation axis rotary evaporator for accurately and quantitatively concentrating multiple samples at once includes a support frame 1. A motor 2 is fixed on the support frame 1. The motor 2 drives distillation flasks on two axes (171 and 172) to rotate through a transmitter 3 (the rotary evaporator in this embodiment is also provided with a control panel and components for controlling the rotational speed of the motor and heating temperature, and are not shown in the figure). A detachable distillation flask group 4 is fixed at one end of the transmitter 3. A detachable condenser group 5 is fixed at the other end. A bottom of a condenser in the condenser group 5 is connected to a respective collecting flask 6.

The distillation flask can rotate in one direction or alternately in two directions. The two rotation axes 171 and 172 have a dip angle of 13 degrees with the horizontal plane. Each rotation axis is provided with two distillation flasks connected in sequence and rotated along the same axis. The setup of distillation flasks and respective openings are described in Embodiment 1.

Different from Embodiment 1, the third flask opening of each distillation flask is connected to a concentrated liquid quantitative assembly 7.

The connection and support arrangement of two adjacent distillation flasks on the same axis are described above in Embodiment 1.

The first flask neck of the distillation flask is preferably provided with a spherical structure near the flask (as shown in FIG. 3) to prevent bumping.

The concentrated liquid quantitative assembly 7 includes a first liquid discharge valve 71 disposed at the third flask opening of the distillation flask, a quantitative tube 73 with quantitative scale lines 72, and a second discharge valve 74 disposed at an end away from the distillation flask of the quantitative tube 73. Cooperation of the two valves is used to control accurately quantitative discharge of a concentrated liquid and sealing of the distillation flask under different pressure of vacuum environment inside evaporation system and external environment.

The quantifying capacity of the quantitative tube 73 is set to 1 ml, and the accuracy of the quantitative scale may reach 0.01 ml.

The concentrated liquid quantitative assembly 7 is connected to the third flask opening of the distillation flask in a sealed way by a glass ground opening, and the connection is fixed by a clamp 8.

The first discharge valve 71 and the second discharge valve 74 are made of polytetrafluoroethylene.

Figure 4:
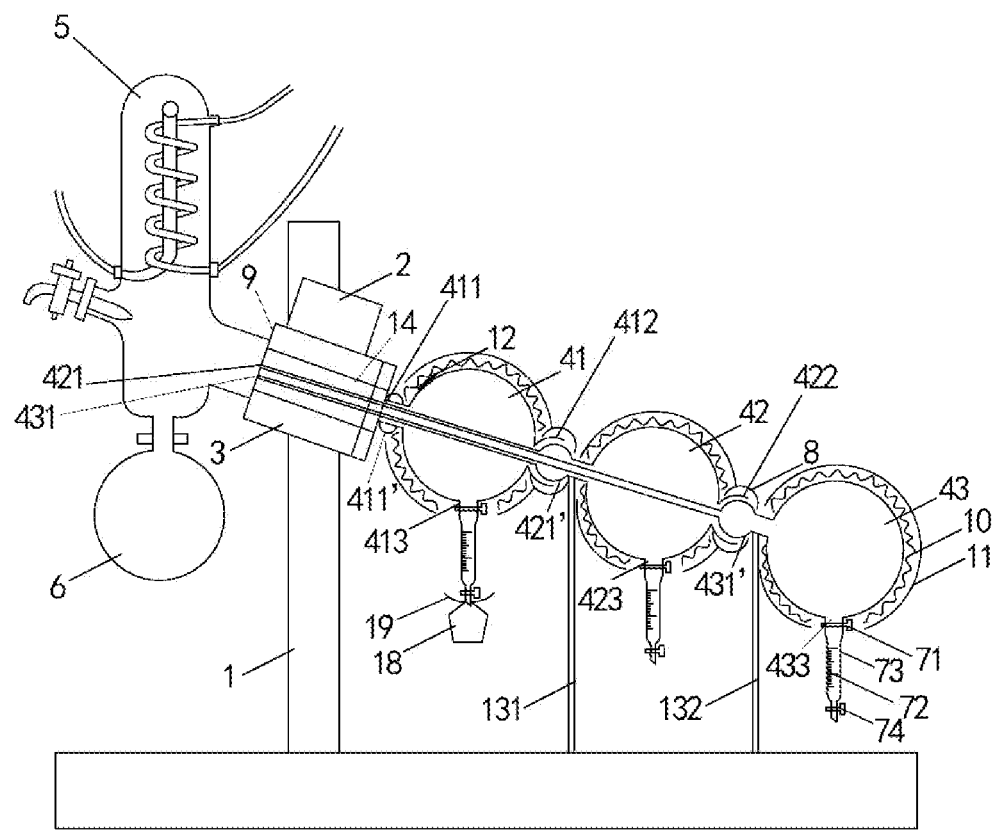
FIG. 4 is a schematic structure diagram of the rotary evaporator (single rotation axis) for accurately and quantitatively concentrating multiple samples at once according to an embodiment of the present invention.

A capacity increase unit 18 and a solution receiving tray 19 are disposed at the lower part of the quantitative tube 73 according to the requirement of concentrated liquid volume (as shown in FIG. 4, or the same as the collecting flask 63 in Embodiment 1 can also be used) to realize capacity increase liquid discharge of the concentrated liquid at once.

Four condensers 5 are placed vertically, arranged in a group in parallel, and fixed by frames.

Connectors 9 (as shown in FIG. 6, FIG. 7, and FIG. 8) are disposed between the condenser group 5 and the transmitter 3, and the structure and function of the connector 9 are the same as those of Embodiment 1 as described above.

Solvent evaporation, condensation, and collection of the four solutions to be distillated have respective independent pipelines and the pipelines are not communicated with each other.

Each condenser is provided with a vacuum branch tube: a first vacuum branch tube 151, a second vacuum branch tube 152, a third vacuum branch tube 153, and a fourth vacuum branch tube 154; and each vacuum branch tube is connected to the vacuum tube 15 and connected to the vacuum pump (not shown in the figure) by the vacuum tube 15.

A switch (not shown in the figure) for ventilation is disposed at each vacuum branch tube as required.

The lower end opening of the condenser and the collecting flask 6 are connected by a glass ball ground opening and fixed by a steel clamp.

Each collecting flask includes a first liquid discharge valve 65 at the top, a second liquid discharge valve 64 at the bottom, and a collecting flask 63, and is used to control condensate discharge and system sealing under different pressure of vacuum environment inside evaporation system and external environment.

The heating mode of the distillation flask is the same as that of Embodiment 1 as described above.

The second discharge valve 74 is closed first and the first discharge valve 71 is opened when the rotary evaporator in this embodiment is used. Each quantitative solution to be distilled is added to each distillation flask respectively. Each distillation flask is installed. A heating switch and a vacuum pump switch are turned on. The rotational speed is adjusted to the designed value. Four distillation flasks rotate at the same time. Four solutions to be distilled are heated at the same time. Each evaporated gas enters the condenser and is condensed into liquid under the suction action of the vacuum pump. Each condensate is collected in the collecting flask 6. The volume of concentrated liquid is observed during the distillation process. The rotational speed is gradually reduced to 0 when the volume of concentrated liquid is close to the designed volume. The first discharge valve 71 is closed immediately as soon as the volume of concentrated liquid reaches the designed volume. Then the heating switch and the vacuum pump switch are turned off, and quantitative concentrated liquid is released when the second discharge valve 74 is opened.

The advantages of this embodiment are as follows:

(1) The original one rotation axis is changed into two rotation axes. The original one distillation flask is changed into four distillation flasks. The flask openings are added. The connectors 9 are disposed between the transmitter 3 and the condenser 5. Four condensers and four collecting flasks 6 are disposed, so that each evaporated gas from the four distillation flasks is respectively transported to its respective condenser for condensation, and is collected in its respective collecting flask. The pipelines are not communicated with each other, so as to realize that four samples were concentrated by rotary evaporation at once. The working efficiency of the rotary evaporator in Embodiment 3 is nearly four times that of the prior art rotary evaporator.

(2) The third flask opening is disposed at the lowest liquid level position of each distillation flask in a working state and connected to the concentrated liquid quantitative assembly 7, which is used for accurate quantitation and discharge of concentrated liquid under different pressure inside and outside the evaporation system (the accuracy can reach 0.01 ml), and the sealing of distillation flask. The third flask opening can also be used for ventilation and feeding if the direction of opening is adjusted upward.

(3) The advantages of using the electric heating belt to heat the distillation flasks are as follows: 1) the space resistance is eliminated, making it easy to add the rotation axis, install the concentrated liquid quantitative assembly 7 and four distillation flasks. 2) the water and oil consumption for heating are reduced. 3) a lifting system does not need to be used, the components are reduced, and the cost is reduced.

Embodiment 4

Figure 5:
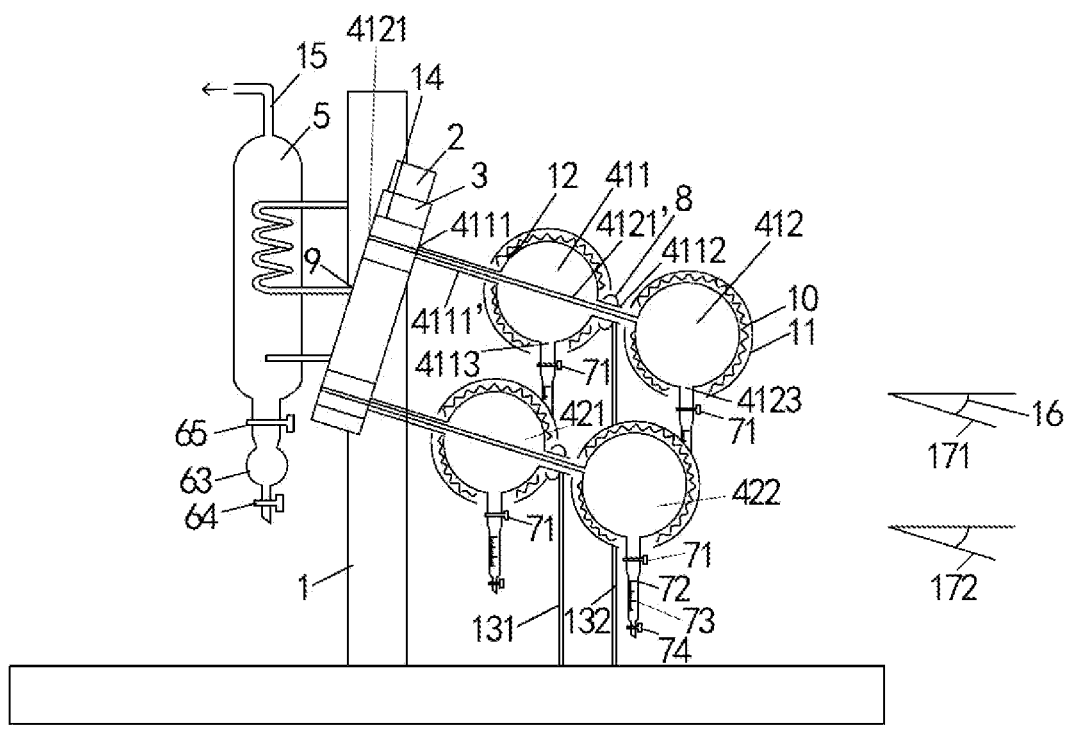
FIG. 5 is another schematic structure diagram of a multi-rotation axis rotary evaporator for accurately and quantitatively concentrating multiple samples at once according to an embodiment of the present invention.

A multi-rotation axis rotary evaporator for accurately and quantitatively concentrating multiple samples at once (as shown in FIG. 5). Different from Embodiment 3, one condenser and one collecting flask are disposed. The evaporated gas from four distillation flasks is condensed into one same condenser and collected in one same collecting flask finally. The working efficiency of the rotary evaporator in Embodiment 4 is nearly four times that of the prior art rotary evaporator. For the rest, see Embodiment 3.

Embodiment 5

A rotary evaporator for accurately and quantitatively concentrating multiple samples at once (shown in FIG. 4), a rotation axis is disposed, three distillation flasks are connected in sequence and rotated along the same axis. For the rest, see Embodiment 3. The working efficiency of the rotary evaporator in Embodiment 5 is nearly three times that of the prior art rotary evaporator.

Figure 9:
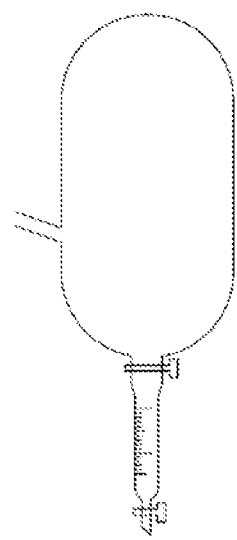
FIG. 9 is another schematic structure diagram of a distillation flask of a rotary evaporator according to an embodiment of the present invention.

As shown in FIG. 9, in order to avoid the unstable rotation of the distillation flask, it is preferred that the mass of the distillation flask on both sides of any plane where the rotation axis is located is the same.

In some embodiments, the two distillation flasks on the same rotation axis can also be connected with the structure as shown in FIG. 10 (the third flask openings of the two distillation flasks are not shown). This structure is convenient for glass processing. The first neck 4121' of the second distillation flask 412 is integrated with the first distillation flask 411, not with the second distillation flask 412. A part 4121a' of the first neck 4121' of the second distillation flask is in the first distillation flask 411, and the length requirement of the first neck 4121' of the second distillation flask is met by sleeved extension tube 4121b'. The second distillation flask 412 is divided into two parts. The second distillation flask 412 is not integrated. As shown in FIG. 10, the second distillation flask 412 has two first flask openings. One first flask opening 4121 is at the end close to the connector of the extension tube, and the other is integrated with the second distillation flask 412 (the only flask opening of the second distillation flask 412).

The present invention has been introduced in detail above. In this paper, the principle and implementations of the present invention are described by applying specific embodiments. The description of the above embodiments is only used to help understand the method and core ideas of the present invention. According to the ideas of the present invention, the general technical personnel in the field will change in the specific implementation and application scope. To sum up, the content of the specification shall not be interpreted as a limitation of the present invention.

Although the subject matter has been described in terms of exemplary embodiments, it is not limited thereto. Rather, the appended claims should be construed broadly, to include other variants and embodiments, which may be made by those skilled in the art.

What is claimed is:

1. A rotary evaporator for quantitatively recovering multiple solvents at once, comprising:
   a support frame;
   a motor fixed on the support frame;
   a transmitter;
   a distillation flask group detachably fixed at a first end of the transmitter, the distillation flask group comprising a plurality of distillation flasks on at least one rotation axis;
   a condenser group detachably connected at a second end of the transmitter, the condenser group comprising a plurality of condensers;
   wherein:
   the motor is configured to drive the plurality of distillation flasks on the at least one rotation axis to rotate through the transmitter;
   a collector is connected to a bottom of each condenser in the condenser group;
   each rotation axis is provided with one distillation flask or at least two distillation flasks connected in sequence and rotated along the same rotation axis;
   a connector is disposed between the condenser group and the transmitter when the number of distillation flasks on any rotation axis is greater than 1;
   the distillation flasks, the condensers and the collectors have the same number; and evaporation, condensation and collection of each liquid to be distilled have respective independent pipelines not communicated with each other.

2. The rotary evaporator according to claim 1, wherein a top of each condenser is connected to a vacuum branch tube, the vacuum branch tubes are connected to a vacuum tube, the vacuum tube is connected to a vacuum pump, or the vacuum branch tubes are connected to the vacuum pump.

3. The rotary evaporator according to claim 2, wherein a check valve is disposed at the vacuum branch tube.

4. The rotary evaporator according to claim 1, wherein
   a bracket is disposed at a lower part of the distillation flask group and between two adjacent distillation flasks on the same rotation axis for support;
   two flask openings including a respective first flask opening and a respective third flask opening are disposed on a distillation flask farthest from the transmitter on each rotation axis, three flask openings including a respective first flask opening, a respective second flask opening, and a respective third flask opening, are disposed on the other distillation flasks; and
   the respective first flask opening of each distillation flask is nearest to the transmitter, the respective third flask opening of each distillation flask is disposed on a lowest point of each distillation flask and is provided with a valve.

5. The rotary evaporator according to claim 1, wherein a second flask opening of a first distillation flask and a first neck or a first opening of a second distillation flask on the same rotation axis are connected in a sealed way and fixed by a clamp, or the first distillation flask and the second distillation flask are connected by a coupling in a sealed way.

6. The rotary evaporator according to claim 5, wherein the connector comprises a base plate and condensing tubes and steam tubes respectively located on both sides of the base plate, and is fixed at an end adjacent to the condenser of the transmitter;
   each connector corresponds to one rotation axis;
   at least two condensing tubes are disposed on one side of the base plate adjacent to the condenser, at least two steam tubes are disposed on the other side of the base plate adjacent to the transmitter; evaporated gas from the first distillation flask first passes through a first steam tube, then passes through a first condensing tube, at last enters a first condenser for condensation, evaporated gas from the second distillation flask first passes through a second steam tube, then passes through a second condensing tube, at last enters a second condenser for condensation; and
   the first steam tube and a glass shaft are fitted and are connected in a sealed way, the glass shaft is a hollow glass tube on an innermost layer of the transmitter and does not rotate with the motor, the second steam tube and a first flask opening or an extension tube of the second distillation flask are fitted and are connected in a sealed way.

7. The rotary evaporator according to claim 4, wherein a spherical structure is configured to be adjacent to a flask body at a corresponding flask neck where the respective first flask opening of each distillation flask is located; and
   the plurality of distillation flasks are heated by a heating assembly, and the heating assembly is an electric heating belt.

8. The rotary evaporator according to claim 1, wherein the collector comprises a first liquid discharge valve at the top, a second liquid discharge valve at the bottom, a quantitative tube with quantitative scale lines and a collecting flask with a capacity that are disposed between the two valves, and the collector is used to control quantitative condensate discharge and system sealing.

9. A rotary evaporator for quantitatively concentrating multiple samples at once, comprising:
   a support frame;
   a motor fixed on the support frame;
   a transmitter;
   a distillation flask group detachably fixed at a first end of the transmitter, the distillation flask group comprising a plurality of distillation flasks on at least one rotation axis;
   a condenser or a condenser group detachably connected at a second end of the transmitter, the condenser group comprising a plurality of condensers;
   wherein:
   the motor is configured to drive the distillation flasks on at least one rotation axis to rotate through the transmitter;
   a collecting flask is connected to a bottom of each condenser;
   each rotation axis is provided with one distillation flask or at least two distillation flasks connected in sequence and rotated along the same rotation axis, each distillation flask is connected to a concentrated liquid quantitative assembly; and a connector is disposed between the condenser and the transmitter when the number of distillation flasks on any rotation axis is greater than 1,
   wherein a second flask opening of a first distillation flask and a first neck or a first opening of a second distillation flask on the same rotation axis are connected in a sealed way and fixed by a clamp, or the first distillation flask and the second distillation flask are connected by a coupling in a sealed way.

10. The rotary evaporator according to claim 9, wherein a top of the condenser is connected to a vacuum pump by a vacuum tube; and
   in a case that the number of condensers is greater than 1, each condenser is connected to a vacuum branch tube, the vacuum branch tubes are connected to the vacuum tube, the vacuum tube is connected to the vacuum pump, or the vacuum branch tubes are connected to the vacuum pump.

11. The rotary evaporator according to claim 10, wherein a check valve is disposed at the vacuum branch tube.

12. The rotary evaporator according to claim 9, wherein a bracket is disposed at a lower part of the distillation flask group and between two adjacent distillation flasks on the same rotation axis for support.

13. The rotary evaporator according to claim 12, wherein a capacity increase unit is disposed at a lower part of a quantitative tube of the concentrated liquid quantitative assembly.

14. The rotary evaporator according to claim 9, wherein the connector comprises a base plate and condensing tubes and steam tubes respectively located on both sides of the base plate, and is fixed at an end adjacent to the condenser of the transmitter; each connector corresponds to one rotation axis;

at least two condensing tubes are disposed on one side of the base plate adjacent to the condenser, at least two steam tubes are disposed on the other side of the base plate adjacent to the transmitter; evaporated gas from the first distillation flask first passes through a first steam tube, then passes through a first condensing tube, at last enters a first condenser for condensation; evaporated gas from the second distillation flask first passes through a second steam tube, then passes through a second condensing tube, at last enters a second condenser for condensation;

the first steam tube and a glass shaft are fitted and are connected in a sealed way, the glass shaft is a hollow glass tube on an innermost layer of the transmitter and does not rotate with the motor; the second steam tube and the first flask opening or an extension tube of the second distillation flask are fitted and are connected in a sealed way.

15. The rotary evaporator according to claim 9, wherein a spherical structure is configured adjacent to a flask body at a flask neck where the first flask opening of the second distillation flask is located; and the plurality of distillation flasks is heated by a heating assembly, and the heating assembly is an electric heating belt.

* * * * *